United States Patent
Kim

(10) Patent No.: US 12,363,248 B2
(45) Date of Patent: Jul. 15, 2025

(54) METHOD, DEVICE, AND NON-TRANSITORY COMPUTER-READABLE RECORDING MEDIUM TO PROVIDE BODY EFFECT FOR VIDEO CALL

(71) Applicant: LINE Plus Corporation, Seongnam-si (KR)

(72) Inventor: Na Young Kim, Seongnam-si (KR)

(73) Assignee: LINE Plus Corporation, Gyeonggi-Do (KR)

( * ) Notice: Subject to any disclaimer, the term of this patent is extended or adjusted under 35 U.S.C. 154(b) by 82 days.

(21) Appl. No.: 17/976,109

(22) Filed: Oct. 28, 2022

(65) Prior Publication Data

US 2023/0137171 A1    May 4, 2023

(30) Foreign Application Priority Data

Nov. 1, 2021    (KR) .................. 10-2021-0147998

(51) Int. Cl.
*H04N 5/262* (2006.01)
*G06F 3/04845* (2022.01)
*H04N 7/15* (2006.01)
*H04N 5/272* (2006.01)

(52) U.S. Cl.
CPC ....... *H04N 5/2621* (2013.01); *G06F 3/04845* (2013.01); *H04N 7/157* (2013.01); *H04N 2005/2726* (2013.01)

(58) Field of Classification Search
CPC .............................. H04N 5/2621; H04N 7/157
USPC ...................................................... 348/207.99
See application file for complete search history.

(56) References Cited

U.S. PATENT DOCUMENTS

| | | | |
|---|---|---|---|
| 7,227,567 B1 * | 6/2007 | Beck ...................... | H04N 7/147 348/14.07 |
| 11,134,217 B1 * | 9/2021 | Goel ..................... | G06V 40/174 |
| 11,190,735 B1 * | 11/2021 | Trim ...................... | G06V 20/52 |
| 11,601,618 B1 * | 3/2023 | Slotznick ............... | H04N 7/147 |
| 2008/0117283 A1 * | 5/2008 | Yang ..................... | H04N 7/147 348/14.02 |
| 2012/0206560 A1 * | 8/2012 | Setton .................... | H04N 7/147 348/E7.083 |
| 2012/0236105 A1 * | 9/2012 | Alberth .................. | H04N 7/147 345/646 |
| 2013/0242031 A1 * | 9/2013 | Petterson ............... | H04N 7/157 348/14.07 |

(Continued)

FOREIGN PATENT DOCUMENTS

| | | | | |
|---|---|---|---|---|
| KR | 100401262 B1 | 10/2003 | | |
| KR | 1020180017693 A | * | 2/2018 | ............. G06Q 30/06 |
| WO | WO-2015130309 A1 | * | 9/2015 | ............. H04N 7/147 |

*Primary Examiner* — Anthony J Daniels
(74) *Attorney, Agent, or Firm* — Harness, Dickey & Pierce, P.L.C.

(57) ABSTRACT

Methods, computer devices, and non-transitory computer-readable recording mediums to provide a body effect during a video call may be provided. An effect providing method includes recommending an attire body effect for a video call based on at least one of user information and a call purpose, transmitting a user video in which the attire body effect is synthesized in a body portion detected from a camera video to a terminal of a counterpart that participates in the video call, and displaying a video call screen that includes a counterpart video and the user video that participate in the video call.

18 Claims, 11 Drawing Sheets

(56) References Cited

U.S. PATENT DOCUMENTS

| | | | |
|---|---|---|---|
| 2013/0343615 A1* | 12/2013 | Zhang | G06V 20/10 |
| | | | 382/111 |
| 2015/0381933 A1* | 12/2015 | Cunico | G11B 27/036 |
| | | | 348/14.08 |
| 2018/0295324 A1* | 10/2018 | Clark | H04N 7/152 |
| 2019/0244015 A1* | 8/2019 | Lee | H04N 7/141 |
| 2021/0100375 A1* | 4/2021 | Shaaban | G06N 5/022 |
| 2021/0385412 A1* | 12/2021 | Matula | H04N 7/15 |

\* cited by examiner

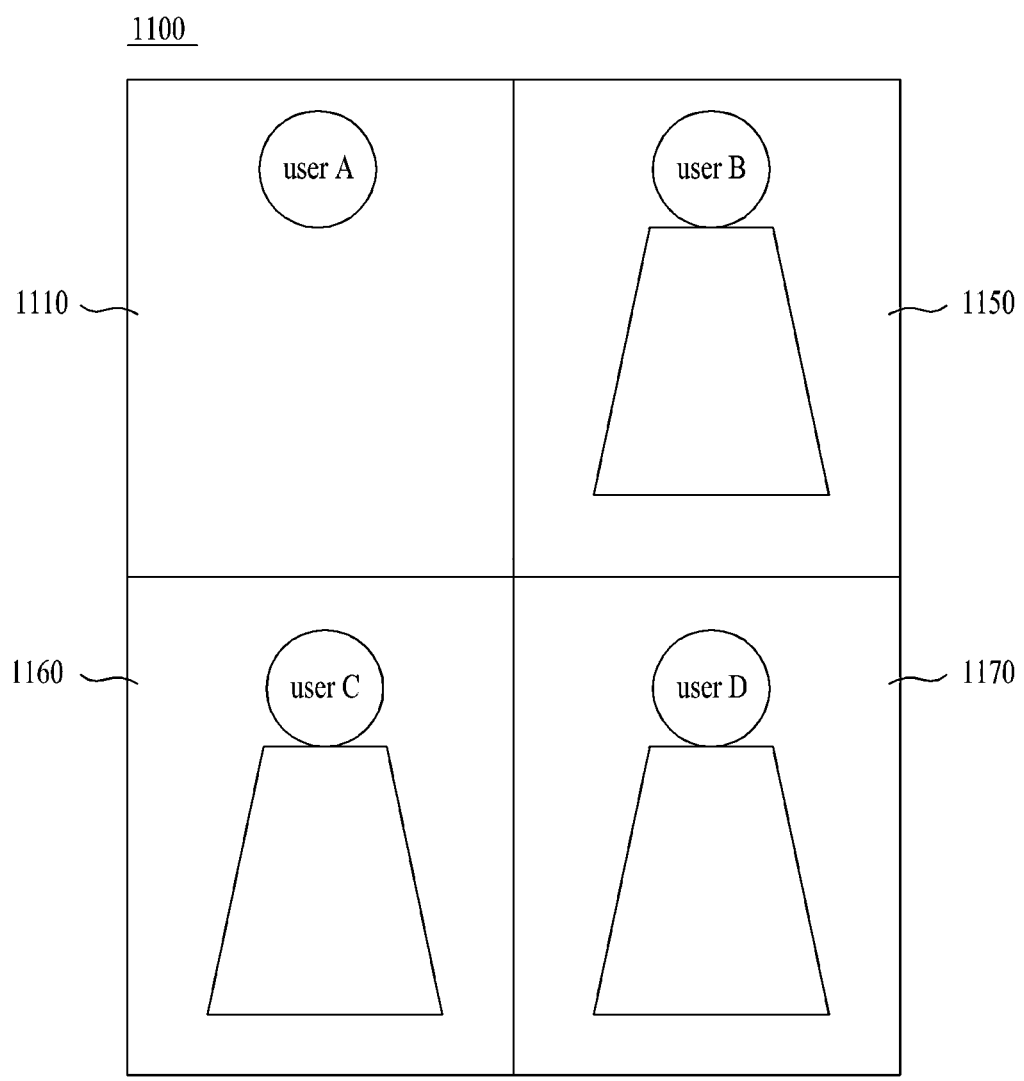

METHOD, DEVICE, AND NON-TRANSITORY COMPUTER-READABLE RECORDING MEDIUM TO PROVIDE BODY EFFECT FOR VIDEO CALL

CROSS-REFERENCE TO RELATED APPLICATION(S)

This U.S. non-provisional application claims the benefit of priority under 35 U.S.C. § 119 to Korean Patent Application No. 10-2021-0147998, filed Nov. 1, 2021, the entire contents of which are incorporated herein by reference in their entirety.

BACKGROUND

Technical Field

Some example embodiments relate to technology for providing a body effect for a video call.

Related Art

A current communication device provides a variety of services, such as a wireless Internet service and a terrestrial/satellite broadcast service, in addition to a voice call service or a text service.

In particular, with developments in video compression technology and recovery technology and commercialization of a device equipped with a camera, a video call service that enables a call while verifying a face of a counterpart is being provided.

For example, the technology for providing a video call service between mobile telephone terminals in a mobile telephone network of a wireless environment is disclosed.

SUMMARY

Some example embodiments may provide a body effect of attire suitable for user information or a call purpose during a video call.

Some example embodiments may provide a body effect of a group uniform applicable to a plurality of participants participating in a video call.

Some example embodiments may provide a body effect that may display only a face and hide the rest during a video call.

According to an aspect of at least one example embodiment, an effect providing method executed by a computer device including at least one processor configured to execute computer-readable instructions included in a memory may be provided. The effect providing method may include, by the at least one processor, recommending an attire body effect for a video call based on at least one of user information and a call purpose, transmitting a user video in which the attire body effect is synthesized in a body portion detected from a camera video to a terminal of a counterpart that participates in the video call, and displaying a video call screen that includes a counterpart video and the user video that participate in the video call.

The recommending may include extracting the user information from an analysis result of the camera video or a pre-registered user profile.

The recommending may include extracting the call purpose from meeting information set to a calendar through interaction with the calendar.

The recommending may include identifying a dress code through at least one of the user information and the call purpose, and recommending the attire body effect having attribute information that matches the dress code.

The transmitting may include transmitting a video in which the attire body effect is overlaid on the body portion as an augmented reality (AR) image as the user video to the terminal of the counterpart.

The displaying may include configuring the video call screen by receiving each counterpart video as an individual video and by rendering the same with the user video as a single screen.

The effect providing method may further include, by the at least one processor, providing a color selection interface, and changing a color of a clothing object included in the body portion to a color selected through the color selection interface.

The effect providing method may further include, by the at least one processor, providing an object selection interface and a color selection interface, and changing a color of an object selected through the object selection interface from among clothing objects included in the body portion to a color selected through the color selection interface.

The effect providing method may further include, by the at least one processor, in response to a selection on a specific body effect, from a list of attire body effects, as a group uniform for the video call among the attire body effects, transmitting information on the specific body effect to the terminal of the counterpart. The displaying may include receiving a counterpart video in which the specific body effect is synthesized in a body portion from the terminal of the counterpart.

The effect providing method may further include, by the at least one processor, providing a body-off effect corresponding to a face-only mode through a list of effects applicable to the camera video, and in response to a selection on the body-off effect from the list of effects, transmitting a video in which a remaining portion excluding a face portion in the camera video is hidden with a transparent effect to the terminal of the user as the user video.

According to an aspect of at least one example embodiment, there is provided a non-transitory computer-readable recording medium storing instructions that, when executed by a processor, cause a computer device to implement the effect providing method.

According to an aspect of at least one example embodiment, a computer device including at least one processor configured to execute computer-readable instructions included in a memory may be provided. The at least one processor may be configured to cause the computer device to recommend an attire body effect for a video call based on at least one of user information and a call purpose, to transmit a user video in which the attire body effect is synthesized in a body portion detected from a camera video to a terminal of a counterpart that participates in the video call, and to display a video call screen that includes a counterpart video and the user video that participate in the video call.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIGS. 10 and 11 illustrate a process of providing a body-off effect during a video call according to at least one example embodiment.

DETAILED DESCRIPTION

Figure 1:
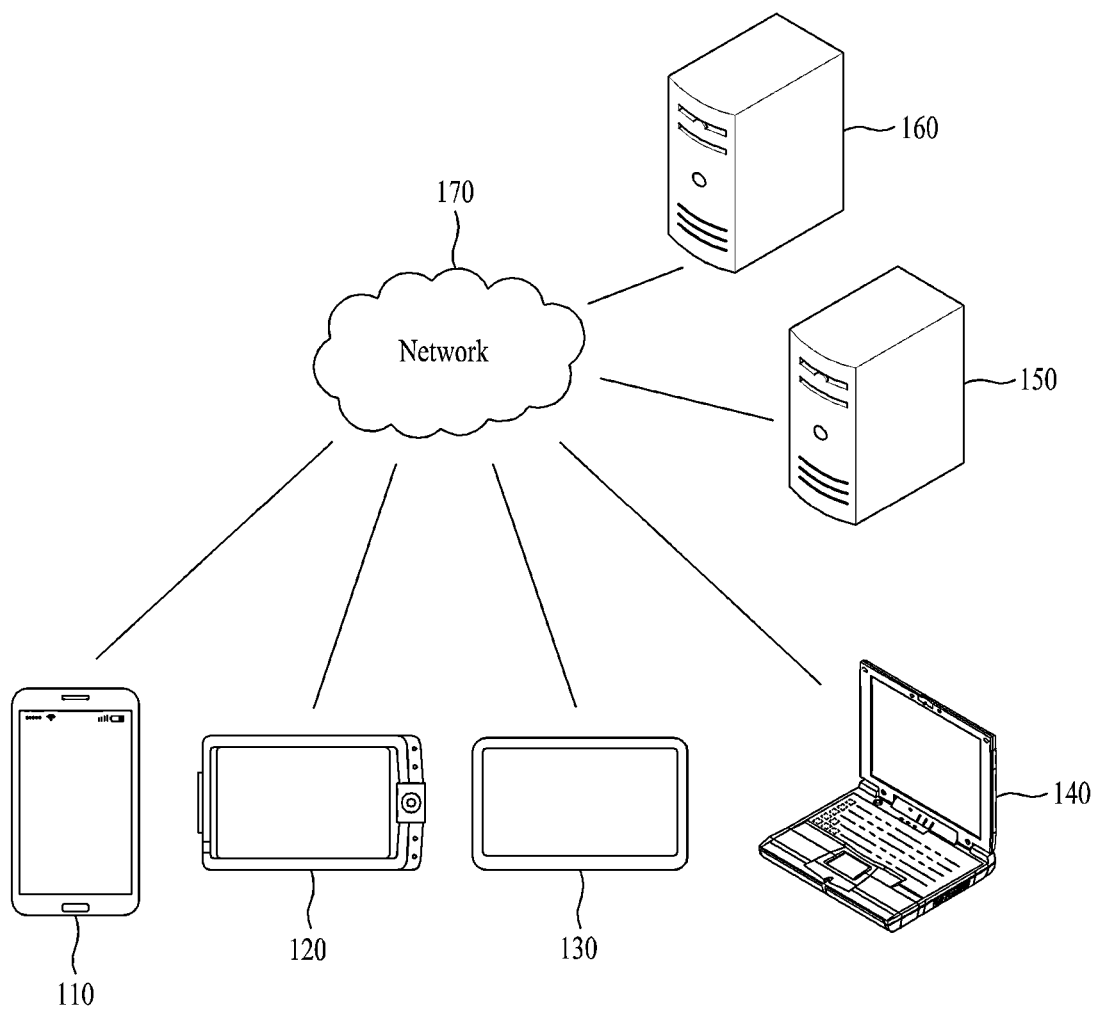
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS.

The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for providing a body effect for a video call.

The example embodiments disclosed herein may provide a body effect of attire applicable to a body portion or a body effect capable of hiding the rest excluding a face during a video call.

An effect providing system according to some example embodiments may be implemented by at least one computer device. An effect providing method according to some example embodiments may be performed by at least one computer device included in the effect providing system. Here, a computer program according to an example embodiment may be installed and run on the computer device and the computer device may perform the effect providing method according to the example embodiment under control of the computer program. The aforementioned computer program may be stored in a computer-readable recording medium to implement the effect providing method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to some example embodiments and an environment applicable to example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service, for example, a video call service, to the plurality of electronic devices 110, 120, 130, and 140 connected over the network 170.

Figure 2:
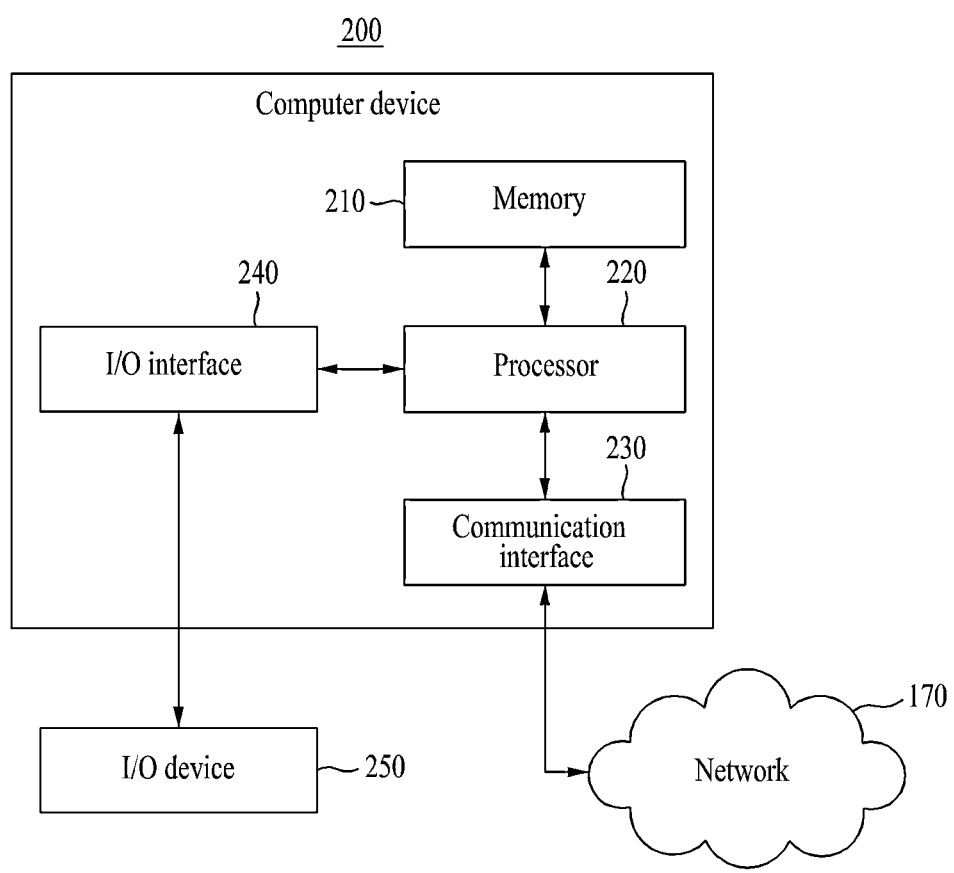
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include a greater or smaller number of components than the number of components of FIG. 2. However, there is no need to clearly illustrate most conventional components. For example, the computer device 200 may be configured to include at least a portion of the I/O device 250 or may further include other components, such as a transceiver and a database.

Hereinafter, a method and apparatus for providing a body effect for a video call according to some example embodiments will be described.

The computer device 200 according to the example embodiment may provide a client with a video call service through connection to an exclusive application installed on the client or a website/mobile site related to the computer device 200. An effect providing system implemented as a computer may be configured in the computer device 200. For example, the effect providing system may be implemented in a form of a program that independently operates or may be configured in an in-app form of a specific application to be operable on the specific application.

The processor 220 of the computer device 200 may be implemented as a component for performing the following effect providing method. Depending on example embodiments, components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations included in the following effect providing method. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200.

The processor 220 may read a necessary instruction from the memory 210 to which instructions related to control of the computer device 200 are loaded. In this case, the read instruction may include an instruction for controlling the processor 220 to perform the following operations.

The following operations may be performed in order different from illustrated order. A portion of the operations may be omitted or an additional process may be further included.

Figure 3:
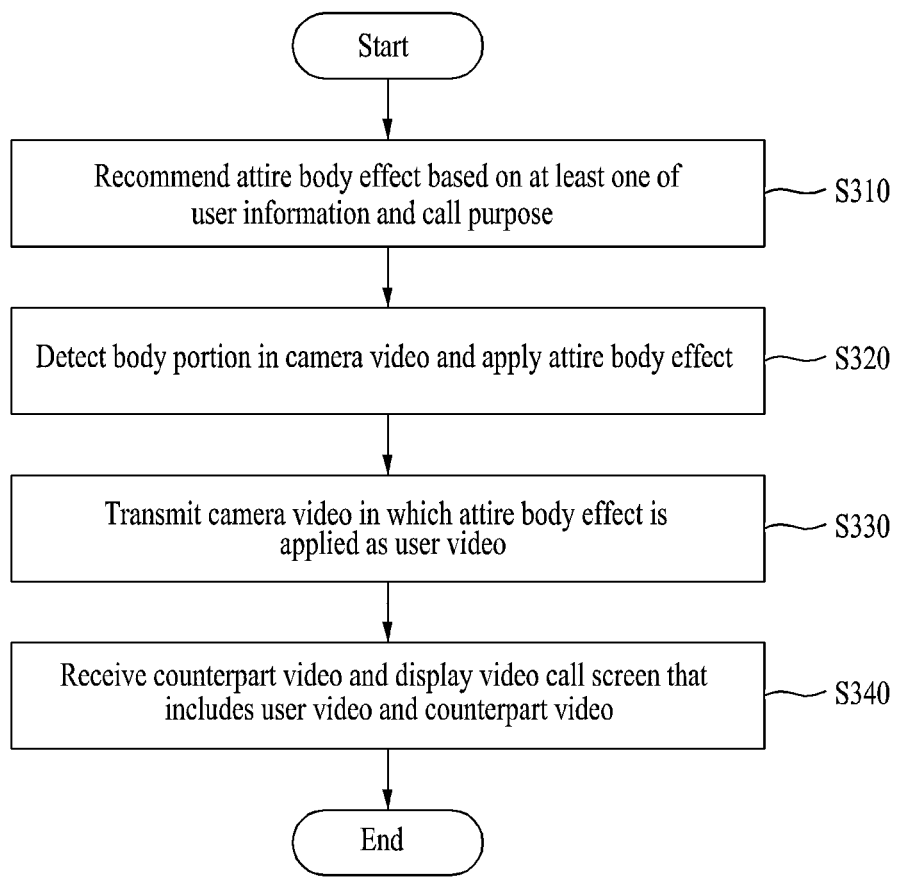
FIG. 3 is a flowchart illustrating an example of a method performed by a computer device according to at least one example embodiment.

FIG. 3 is a flowchart illustrating an example of a method performed by a computer device according to at least one example embodiment.

Referring to FIG. 3, in operation 5310, when providing a list of effects applicable to a camera video for a video call, the processor 220 may recommend an attire body effect based on at least one of (1) user information that requests the list of effects and (2) a call purpose specified by a user.

Herein, the effect may represent an effect filter that may be synthesized in a camera video as content that is configured as an image object. The body effect may represent an effect that may be applied to a body portion excluding a face in the camera video. For example, the attire body effect may represent a body effect that is configured as an image object representing clothes.

A dress code, such as a style, a formality, a shape, and a color of clothes, may be defined according to a gender, an age, an occupation, a time, a place, a situation, etc., and the attire body effect refers to attribute information related to a corresponding effect and may include information on a dress code to which corresponding attire belongs.

The processor 220 may recommend an attire body effect of a dress code that matches user information, such as a gender, an age, and an occupation, or an attire body effect of a dress code that matches a purpose for which the user desires to participate in the video call. Here, the processor 220 may predict a gender or an age of the user from a video analysis result by extracting information from a user profile registered to a service or by analyzing the camera video. Also, the processor 220 may extract the call purpose of the user from meeting information set to a calendar through interaction with the calendar. Depending on example embodiments, the call purpose may be directly set by the user through a setting environment for video call participation.

The processor 220 may identify a dress code through the user information or the call purpose and may provide an attire body effect that matches the identified dress code as a type of a recommended effect.

In operation 5320, when the user selects a body effect of specific attire, the processor 220 may detect a body portion in the camera video and may apply the corresponding attire body effect. The processor 220 may detect and track a face portion and a body portion of the user as a subject area in the camera video through computer vision technology that includes object detection and object tracking. Here, the processor 220 may extract the body portion excluding a face in the camera video and then may overlay and thereby synthesize the attire body effect on the extracted body portion.

In operation 5330, the processor 220 may transmit the camera video in which the attire body effect is applied to the body portion as a user video. That is, the processor 220 may provide the camera video in which the attire body effect is synthesized in the body portion to a terminal of each counterpart that participates in the video call as the user video for the video call.

Herein, the video call may encompass a video call through which video and audio are exchanged between the user and the counterpart, for example, via an Internet telephone (e.g., Voice over Internet Protocol (VoIP)) technology that convers video and audio to a digital packet and transmits the same through a network using an IP address.

The processor 220 may synthesize an attire body effect in a camera video as an augmented reality (AR) image in a streaming environment that transmits a video captured with a camera of the computer device 200 in real time through an Internet line and may provide the same as a single video. The user video includes the appearance of the user wearing virtual attire, instead of clothes the user is actually wearing.

In operation 5340, the processor 220 may receive a counterpart video for the video call from the terminal of the counterpart and may display a video call screen that includes the user video and the counterpart video. The processor 220 may configure the video call screen by receiving each counterpart video that participates in the video call as an individual video and then rendering the received counterpart video with the user video on a single screen.

A server side that provides a video call service may transmit each participant's video as an individual video instead of creating a single video that includes a plurality of participant videos and providing the created video to a client, and a client side may receive each of the plurality of participant videos as an individual video and may configure the same as a video call screen on a single screen.

Figure 4:
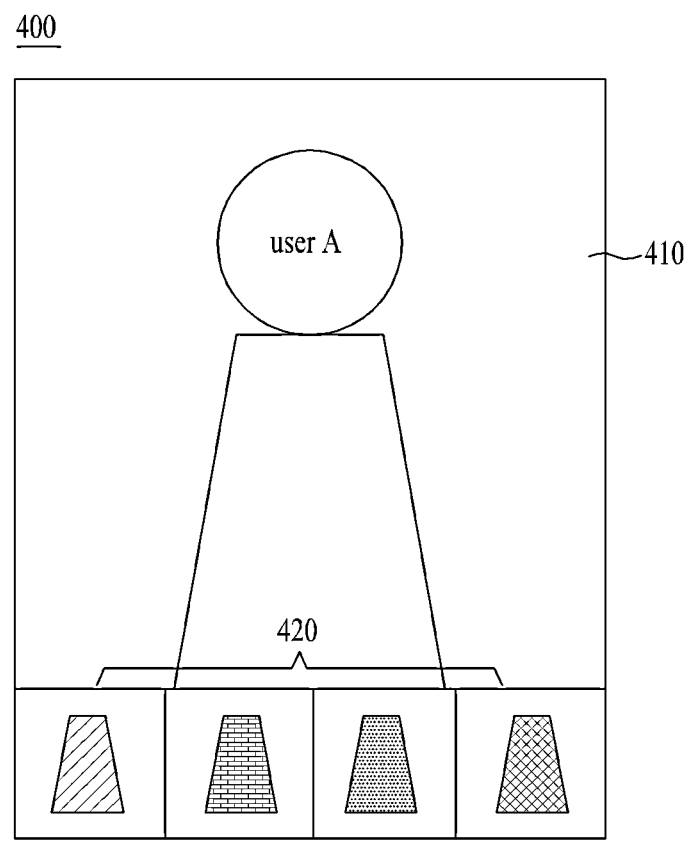
FIGS. 4 to 6 illustrate a process of providing an attire body effect during a video call according to at least one example embodiment.
Figure 5:
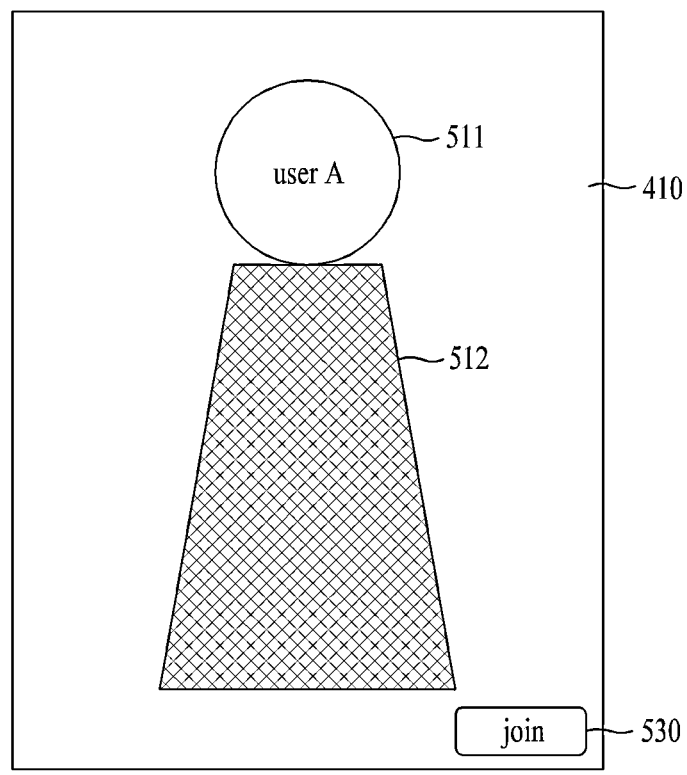
Figure 6:
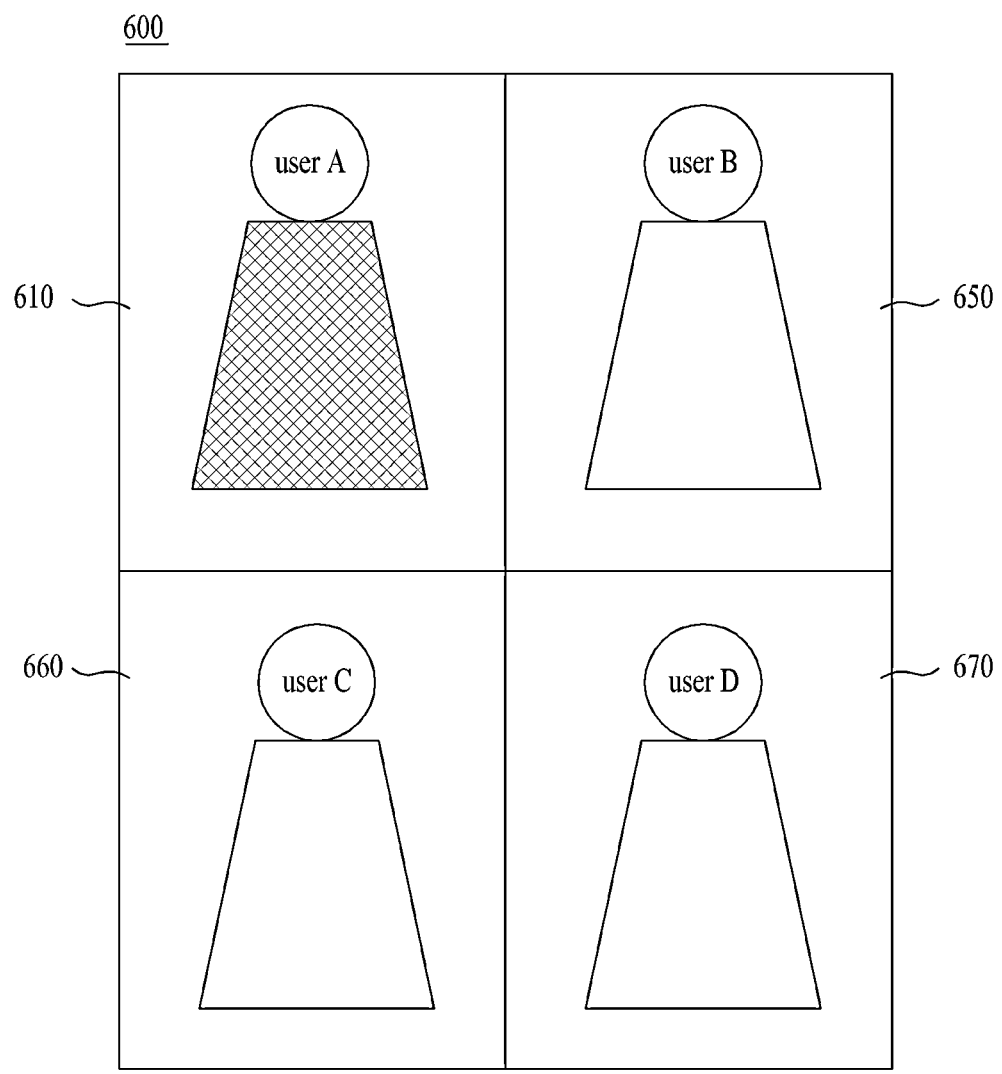

FIGS. 4 to 6 illustrate a process of providing an attire body effect during a video call according to at least one example embodiment.

FIG. 4 illustrates a video call setting screen 400.

Referring to FIG. 4, the processor 220 may display a video captured with the camera of the computer device 200, that is, a camera video 410 through the video call setting screen 400.

When the user requests an attire change through a video call setting environment before the user participates in the video call, the processor 220 may display a list of attire body effects 420 on the video call setting screen 400.

Here, the list of attire body effects 420 may include recommendation information on attire. For example, the list of attire body effects 420 may include an attire body effect that matches user information, such as a gender, an age, and an occupation, and an attire body effect that matches the purpose of the user that desires to participate in the video call.

For example, if the user is a female in twenties, attire classified into the category of women in 20 ties may be recommended. In the case of a video call for a school class, a school uniform may be recommended as attire. In the case of a video call for interview, suite may be recommended. In the case of a video call for a non-face-to-face home party, attire of a dress code (e.g., pajamas) directly set by the user may be recommended.

Referring to FIG. 5, when the user selects a specific attire body effect from the list of attire body effects 420, the processor 220 may detect a body portion 512 excluding a face portion 511 in the camera video 410, may synthesize the attire body effect selected by the user in the detected body portion 512, and then display the same.

The processor 220 may change attire of the user for the video call through the aforementioned process.

The processor 220 may prepare the camera video 410 in which the attire body effect is synthesized as virtual attire not actual attire as the user video for the video call.

When the user changes the attire through the video call setting screen 400 and then inputs a video call participation button (join) 530, the processor 220 may transmit the camera video 410 in which the attire body effect is synthesized to a terminal of each counterpart that participates in the corresponding video call.

Referring to FIG. 6, when the user participates in a video call, the processor 220 may receive counterpart videos 650, 660, and 670 for the video call from terminals of counterparts and may display a video call screen 600 that includes a user video 610 and the counterpart videos 650, 660, and 670.

Here, the processor 220 may configure the video call screen 600 by receiving the respective counterpart videos 650, 660, and 670 of user B, user C, and user D that participate in the video call as individual videos and by rendering the received counterpart videos 650, 660, and 670 with the user video 610 on a screen.

The user video 610 corresponds to a camera video in which an attire body effect selected by the user is synthesized, instead of a video of actual attire.

In addition to synthesizing the attire body effect in the body portion 512 of the camera video 410, the processor 220 may provide a function of changing only a color of clothes actually worn by the user.

In response to a request from the user for changing a color of clothes, the processor 220 may display an interface for color selection on the video call setting screen 400 and may change a color of a clothing object in the body portion 512 to a color selected by the user.

The processor 220 may transmit the camera video in which the color of clothes is changed to a terminal of each counterpart that participates in the corresponding video call as the user video for the video call.

In addition to changing the color of the entire clothing object, when a plurality of clothing objects (e.g., a shirt, a cardigan, etc.) is detected in the body portion 512, the processor 220 may also selectively change a color of a clothing object.

When the user requests a change in a color of clothes, the processor 220 may display an interface for object selection and an interface for color selection on the video call setting screen 400 and, through this, may change a color of a clothing object selected by the user with a color selected by the user.

A camera video of attire of which color is changed with a color selected by the user, instead of a color of actual attire, may be provided as the user video 610 that participates in the video call.

Figure 7:
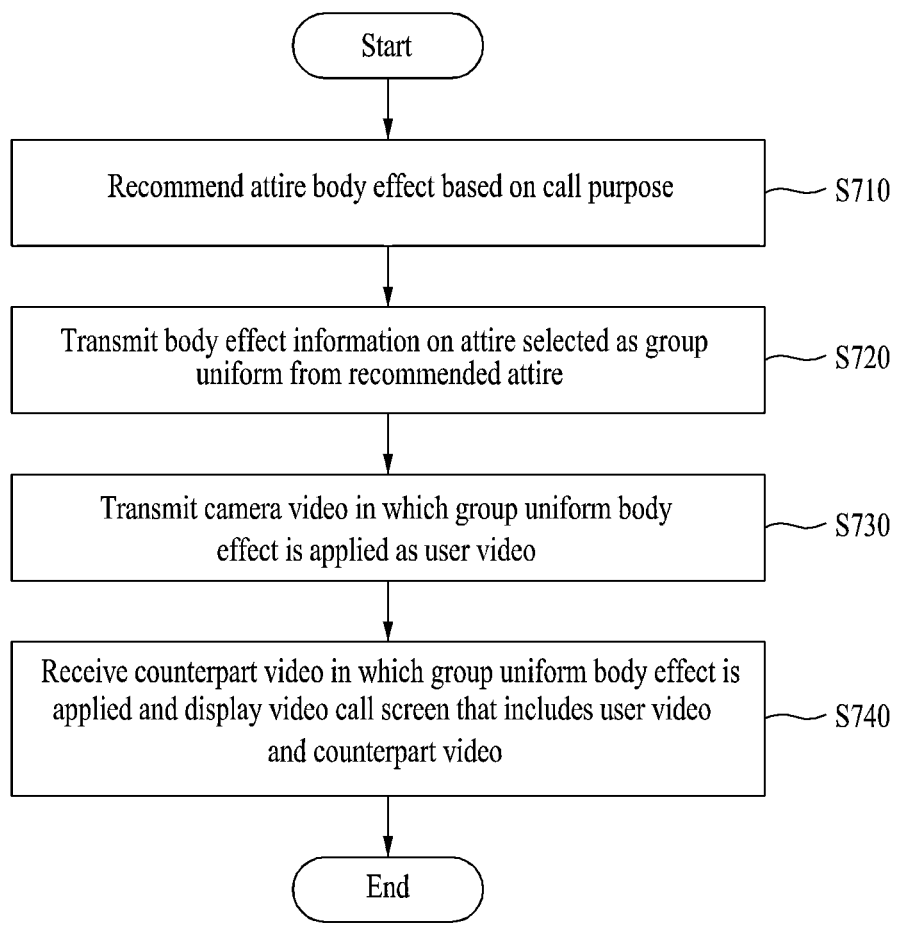
FIG. 7 is a flowchart illustrating another example of a method performed by a computer device according to at least one example embodiment.

FIG. 7 is a flowchart illustrating another example of a method performed by a computer device according to at least one example embodiment.

The processor 220 may provide a body effect that allows video call participants to wear group uniforms suitable for a call purpose.

Referring to FIG. 7, in operation S710, when providing a list of effects applicable to a camera video for a video call, the processor 220 may recommend an attire body effect based on a call purpose specified by a user.

The processor 220 may identify the call purpose of the user from meeting information set to a calendar through interaction with the calendar, or may recognize the call purpose directly set by the user through a setting environment for participating in the video call.

According to the call purpose, for example, the processor 220 may recommend a school uniform as attire for a video call for a school class and may recommend attire of a dress code (e.g., pajamas) directly set by the user for a video call for a non-face-to-face home party.

The processor 220 may identify the dress code through the call purpose of the user and may provide an attire body effect suitable for the identified dress code as a type of a recommended effect.

In operation S720, when the user selects a body effect of specific attire as a group uniform for the video call from the recommended attire, the processor 220 may transmit body effect information on the selected attire to a terminal of each counterpart that participates in the video call for applying a group uniform.

In operation S730, the processor 220 may detect a body portion in the camera video, may apply a group uniform body effect, and then transmit the camera video in which the group uniform body effect is applied to the body portion as a user video. That is, the processor 220 may transmit the camera video in which the group uniform body effect selected by the user is synthesized in the body portion to the terminal of each counterpart that participates in the video call as the user video for the video call.

The processor 220 may receive information on the terminal of each counterpart or the group uniform body effect, may synthesize the corresponding group uniform body effect in the body portion of the camera video, and may provide the same as a call video.

In operation S740, the processor 220 may receive the counterpart video to which the group uniform body effect is applied from the terminal of the counterpart and may display a video call screen that includes the user video and the counterpart video. The processor 220 may configure the video call screen by receiving each counterpart video that participates in the video call as an individual video and by rendering the received counterpart video with the user video on a single screen.

Figure 8:
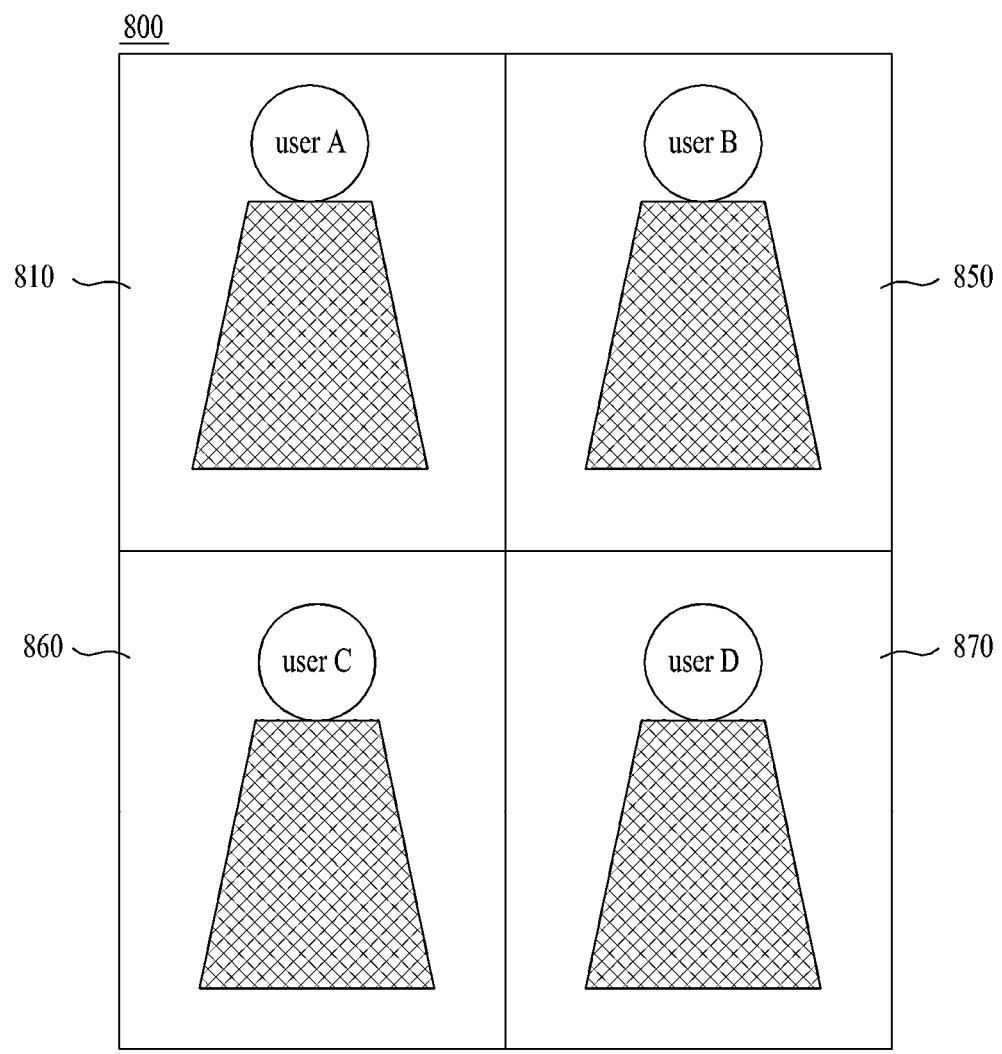
FIG. 8 illustrates an example of a process of providing a group uniform body effect during a video call according to at least one example embodiment.

Referring to FIG. 8, the processor 220 may receive counterpart videos 850, 860, and 870 for a video call from terminals of counterparts and may display a video call screen 800 that includes a user video 810 and the counterpart videos 850, 860, and 870.

The user video 810 and the counterpart videos 850, 860, and 870 correspond to a camera video in which a group uniform body effect selected by the user is synthesized, instead of a video of actual attire.

In the case of a group uniform, whether to apply the group uniform may be determined according to a counterpart's intent to accept. At least a portion of the counterpart videos 850, 860, and 870 may be provided as a video of actual attire or a video in which an attire body effect directly selected by a corresponding user is applied according to a refusal to apply the group uniform.

Figure 9:
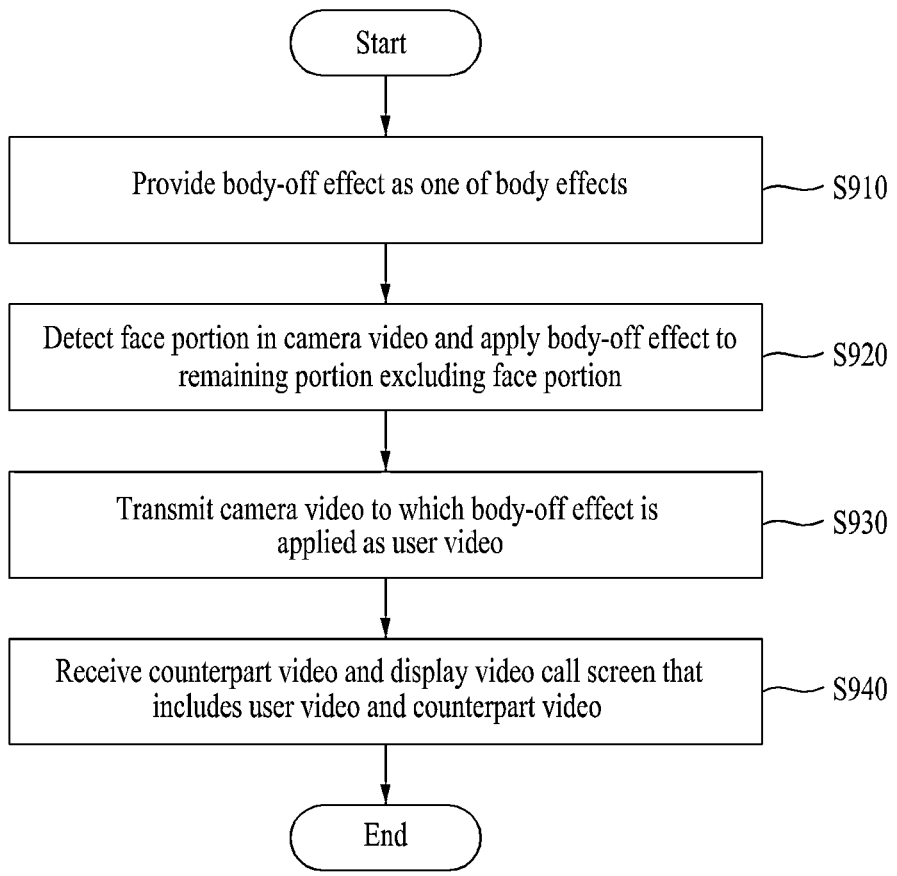
FIG. 9 is a flowchart illustrating still another example of a method performed by a computer device according to at least one example embodiment.

FIG. 9 is a flowchart illustrating still another example of a method performed by a computer device according to at least one example embodiment.

Referring to FIG. 9, in operation S910, when providing a list of effects applicable to a camera video for a video call, the processor 220 may provide a body-off effect as one of body effects.

The body-off effect may correspond to a face-only mode in which only a face portion is displayed and a remaining portion including a body portion and a background portion is not displayed. That is, the body-off effect may display only a face and may hide the remaining portion excluding the face by applying a transparent effect.

In operation S920, when the user selects the body-off effect, the processor 220 may detect the face portion in the camera video and may apply the body-off effect to the remaining portion excluding the face portion. The processor 220 may detect and track the face portion and the body portion of the user as respective subject areas in the camera video through computer vision technology that includes object detection and object tracking. Here, the processor 220 may extract the face portion in the camera video and may synthesize the body-off effect in the remaining portion that includes the body portion and the background portion.

In operation 5930, the processor 220 may transmit the camera video in which the body-off effect is applied to the remaining portion excluding the face as a user video. That is, the processor 220 may transmit the camera video in which the body-off effect is synthesized in the remaining portion excluding the face to the terminal of each counterpart that participates in the video call as the user video for the video call.

In operation 5940, the processor 220 may receive a counterpart video for the video call from the terminal of the counterpart and may display the video call screen that includes the user video and the counterpart video. The processor 220 may configure the video call screen by receiving a counterpart video of each counterpart that participates in the video call as an individual video and rendering the received counterpart video with the user video on a single screen.

Figure 10:
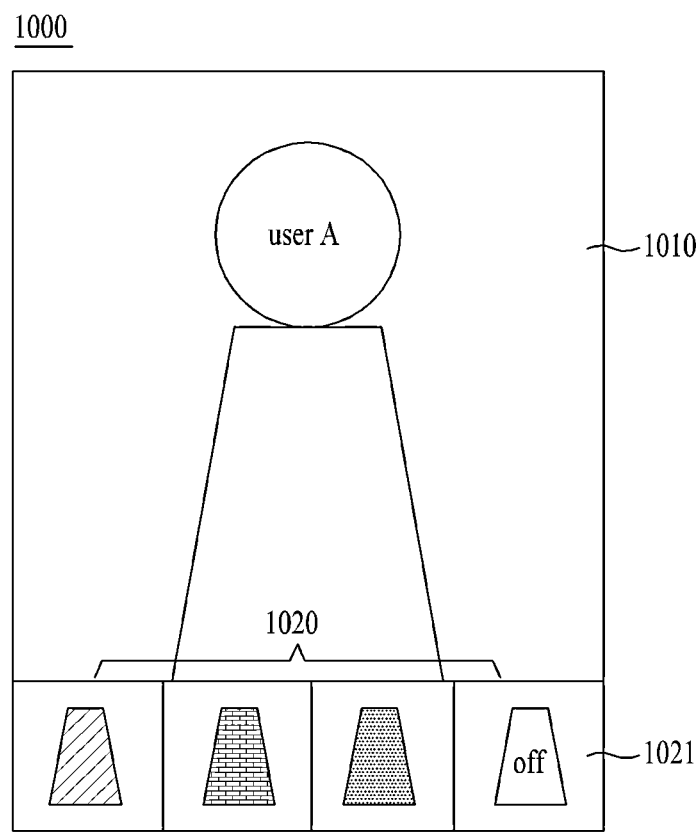

FIGS. 10 and 11 illustrate a process of providing a body-off effect during a video call according to at least one example embodiment.

FIG. 10 illustrates a video setting screen 1000 for a video call.

Referring to FIG. 10, the processor 220 may display a video captured with the camera of the computer device 200, that is, the camera video 1010 through the video setting screen 1000.

When the user requests an effect setting through a video setting environment before participating in the video call, the processor 220 may display a list of body effects 1020 on the video setting screen 1000.

Here, the list of body effects 1020 may include an attire body effect capable of changing attire of a user and a body-off effect (off) 1021 that is a face-only mode for displaying only a face and hiding a body and a background.

When the user selects the body-off effect 1021 from the list of body effects 1020 through the video setting screen 1000, the processor 220 may provide a camera video in which a remaining portion excluding a face is hidden through a transparent effect as a user video for the video call.

Referring to FIG. 11, the processor 220 may receive counterpart videos 1150, 1160, and 1170 for a video call from terminals of counterparts and may display a video call screen 1100 that includes a user video 1110 and the counterpart videos 1150, 1160, and 1170.

Here, the processor 220 may configure the video call screen 1100 by receiving the respective counterpart videos 1150, 1160, and 1170 of user B, user C, and user D that participate in the video call as individual videos and rendering the received counterpart videos 1150, 1160, and 1170 with the user video 1110 on a single screen.

The user video 1110 corresponds to a camera video in which a body-off effect of displaying only a face without displaying actual attire or a background is synthesized.

According to the example embodiments, it is possible to provide a body effect of attire suitable for user information or a call purpose during a video call and/or to provide a body effect of a group uniform applicable to a plurality of participants participating in the video call. Also, according to the example embodiments, it is possible to provide a body effect that may display only a face and hide the rest during a video call.

According to the example embodiments, a list of attire body effects is created based on at least one of (1) user information extracted from a registered user profile or an analysis result of a camera video/image of a user and (2) a call purpose is extracted from meeting information on a calendar of the user. Then, a user interface at which the list of attire body effect is provided and the user is allowed to select a specific attire body effect (including, but not limited to, a group uniform applicable to a plurality of participants participating in the video call and a fac-only (or body-off) effect) from a list of attire body effects is provided on a call screen of the user. Thus, the user can apply an attire body effect to a body portion of the user (or a plurality of users) in the camera video/image using the intuitive user interface and create an augmented reality (AR) image, without performing a series of operations with further computing resources.

The apparatuses described above may be implemented using hardware components, software components, and/or a combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer device, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. An effect providing method executed by a computer device comprising at least one processor configured to execute computer-readable instructions included in a memory, the effect providing method comprising:
   by the at least one processor,
   establishing a video call between a user and a counterpart;
   extracting user information of the user from an analysis result of a camera video of the user captured by a camera of a terminal of the user during the video call;
   recommending an attire body effect for the user in the video call based on the user information;
   transmitting a user video in which the attire body effect is synthesized in a body portion detected from the camera video to a terminal of the counterpart that l participates in the video call;
   displaying a video call screen that includes a counterpart video and the user video that participate in the video call; and
   in response to a selection of a specific body effect, from a list of attire body effects, as a group uniform for the video call, transmitting information on the specific body effect to the terminal of the counterpart,
   wherein the displaying comprises
      receiving a counterpart video in which the specific body effect is synthesized in a body portion of the counterpart video from the terminal of the counterpart, in response to the terminal of the counterpart generating an intent to accept for the specific body effect as the group uniform, and
      receiving a counterpart video in which a body portion of the counterpart video represents actual attire of the counterpart or an attire body effect selected by the counterpart is applied to the body portion of the counterpart video while the specific body effect is not synthesized in the body portion of the counterpart video, in response to the terminal of the counterpart generating an intent to refuse for the specific body effect as the group uniform.

2. The effect providing method of claim 1, wherein the extracting comprises predicting, as the user information, a gender or an age of the user from the analysis result of the camera video.

3. The effect providing method of claim 1, wherein the method further comprises:
   by the at least one processor,
   determining a call purpose for the video call,
   wherein the recommending comprises recommending the attire body effect for the user in the video call based on the user information and the call purpose, and
   wherein the determining comprises extracting the call purpose from meeting information set to a calendar through interaction with the calendar.

4. The effect providing method of claim 1,
   wherein the method further comprises:
      by the at least one processor,
      determining a call purpose for the video call,
   wherein the recommending comprises recommending the attire body effect for the user in the video call based on the user information and the call purpose,
   wherein the recommending comprises
      identifying a dress code through at least one of the user information and the call purpose, and
      recommending the attire body effect having attribute information that matches the dress code.

5. The effect providing method of claim 1, wherein the transmitting comprises transmitting a video in which the attire body effect is overlaid on the body portion as an augmented reality (AR) image as the user video to the terminal of the counterpart.

6. The effect providing method of claim 1, wherein the displaying comprises configuring the video call screen by receiving each counterpart video as an individual video and by rendering the same with the user video as a single screen.

7. The effect providing method of claim 1, further comprising:
   by the at least one processor,
   providing a color selection interface; and
   changing a color of a clothing object included in the body portion to a color selected through the color selection interface.

8. The effect providing method of claim 1, further comprising:
   by the at least one processor,
   providing an object selection interface and a color selection interface; and
   changing a color of an object selected through the object selection interface from among clothing objects included in the body portion to a color selected through the color selection interface.

9. A non-transitory computer-readable recording medium storing instructions that, when executed by a processor, cause a computer device to implement the effect providing method of claim 1.

10. A computer device comprising:
    at least one processor configured to execute computer-readable instructions included in a memory such that the at least one processor is configured to cause the computer device to
    establish a video call between a user and a counterpart,
    extract user information of the user from an analysis result of a camera video of the user captured by a camera of a terminal of the user during the video call,
    recommend an attire body effect for the user in the video call based on the user information, transmit a user video in which the attire body effect is synthesized in a body portion detected from the camera video to a terminal of the counterpart that participates in the video call, display a video call screen that includes a counterpart video and the user video that participate in the video call, and in response to a selection of a specific body effect, from a list of attire body effects, as a group uniform for the video call, transmit information on the specific body effect to the terminal of the counterpart, wherein the at least one processor is further configured to cause the computer device to display the video call by
receiving a counterpart video in which the specific body effect is synthesized in a body portion of the counterpart video from the terminal of the counterpart, in response to the terminal of the counterpart generating an intent to accept for the specific body effect as the group uniform, and receiving a counterpart video in which a body portion of the counterpart video represents actual attire of the counterpart or an attire body effect selected by the counterpart is applied to the body portion of the counterpart video while the specific body effect is not synthesized in the body portion of the counterpart video, in response to the terminal of the counterpart generating an intent to refuse for the specific body effect as the group uniform.

11. The computer device of claim 10, wherein the at least one processor is configured to cause the computer device to extract the user information by predicting, as the user information, a gender or an age of the user from the analysis result of the camera video.

12. The computer device of claim 10, wherein the at least one processor is configured to cause the computer device to extract a call purpose from meeting information set to a calendar through interaction with the calendar.

13. The computer device of claim 10, wherein the at least one processor is further configured to cause the computer device to,
determine a call purpose for the video call,
wherein the recommending comprises recommending the attire body effect for the user in the video call based on the user information and the call purpose, and
wherein the at least one processor is configured to cause the computer device to
identify a dress code through at least one of the user information and the call purpose, and
recommend the attire body effect having attribute information that matches the dress code.

14. The computer device of claim 10, wherein the at least one processor is configured to cause the computer device to transmit a video in which the attire body effect is overlaid on the body portion as an augmented reality (AR) image as the user video to the terminal of the counterpart.

15. The computer device of claim 10, wherein the at least one processor is configured to cause the computer device to,
provide a color selection interface, and
change a color of a clothing object included in the body portion to a color selected through the color selection interface.

16. The computer device of claim 10, wherein the at least one processor is configured to cause the computer device to,
provide an object selection interface and a color selection interface, and
change a color of an object selected through the object selection interface from among clothing objects included in the body portion to a color selected through the color selection interface.

17. The computer device of claim 10, wherein the at least one processor is configured to cause the computer device to,
provide a body-off effect corresponding to a face-only mode through a list of effects applicable to the camera video, and
in response to a selection of the body-off effect from the list of effects, transmit a video in which a remaining portion excluding a face portion in the camera video is hidden with a transparent effect to the terminal of the user as the user video.

18. An effect providing method executed by a computer device comprising at least one processor configured to execute computer-readable instructions included in a memory, the effect providing method comprising:
by the at least one processor,
recommending an attire body effect for a video call based on at least one of user information and a call purpose;
transmitting a user video in which the attire body effect is synthesized in a body portion detected from a camera video to a terminal of a counterpart that participates in the video call;
displaying a video call screen that includes a counterpart video and the user video that participate in the video call;
providing a body-off effect corresponding to a face-only mode through a list of effects applicable to the camera video; and
in response to a selection on the body-off effect from the list of effects, transmitting a video in which a remaining portion excluding a face portion in the camera video is hidden with a transparent effect to the terminal of the user as the user video.

* * * * *